Dec. 31, 1963  G. T. NAKAHIRA  3,115,699
AUTOMATIC TRANSMISSION SPRING COMPRESSING TOOL
Filed May 29, 1961  2 Sheets-Sheet 1

INVENTOR,
GEORGE T. NAKAHIRA;
BY
ATTORNEY

Dec. 31, 1963  G. T. NAKAHIRA  3,115,699
AUTOMATIC TRANSMISSION SPRING COMPRESSING TOOL
Filed May 29, 1961  2 Sheets-Sheet 2
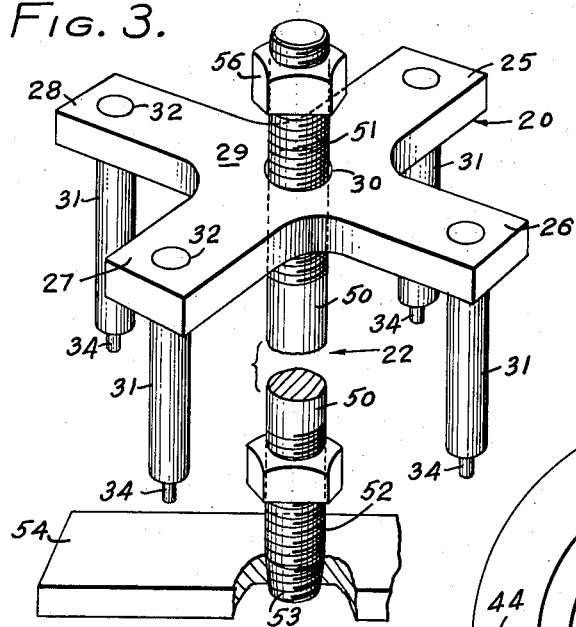
Fig. 3.
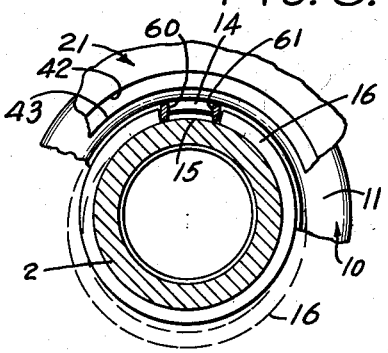
Fig. 8.
Fig. 6.
Fig. 4.
Fig. 7.
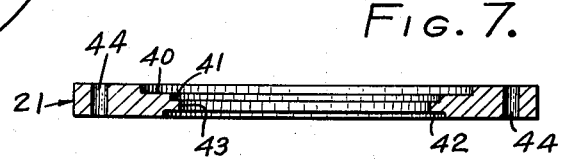
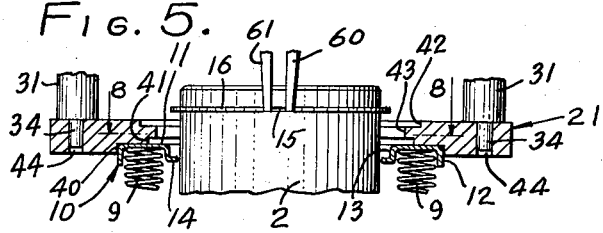
Fig. 5.
INVENTOR,
GEORGE T. NAKAHIRA;
BY
ATTORNEY

United States Patent Office 3,115,699
Patented Dec. 31, 1963

---

3,115,699
AUTOMATIC TRANSMISSION SPRING
COMPRESSING TOOL
George T. Nakahira, 1720 W. 146th St., Gardena, Calif.
Filed May 29, 1961, Ser. No. 113,365
1 Claim. (Cl. 29—226)

The present invention relates to improvements in automatic transmission spring compressing tools.

Most automatic transmissions incorporated in motor vehicles by different manufacturers require many different sets of tools for the assembling or disassembling thereof. This presents a problem to the small automobile repair shop as it entails the expenditure of large sums of money for the tools necessary for the overhauling of different automatic transmissions.

A proper sealing relationship must be maintained between the clutch drum and the piston which is movable therein, as well as proper spring pressure against the piston. As a consequence, when a piston is disassembled from the clutch drum, the piston release springs must be removed. Usually there are a large number of piston release springs arranged in annular formation and surrounding the clutch drum hub. The usual practice is to provide a power press and various tools whereby the piston release springs may be compressed in order to be able to remove a snap ring which encircles the hub of the clutch drum and engages a spring retainer ring. Access to the snap ring sometimes is difficult and different means must be employed for the purpose of engaging the spring retainer ring for the purpose of compressing the piston release springs. On the market today are more than fifty different types of automatic transmissions put out by so-called standard manufacturers. Thus, a large expense is incurred by the automobile repair shop in the installing of the necessary equipment for the overhaul of automatic clutches.

An object of the present invention is to provide inexpensive means whereby an automatic transmission clutch drum may be easily disassembled or reassembled with a minimum number of devices. I provide a tool requiring a low investment expense on the part of the automobile repair shop and which tool is adaptable to all standard makes of automatic transmissions.

A further object is to provide an automatic transmission clutch drum spring compression tool which may be operated either manually or by power and which is simple of construction, fool proof in operation and generally superior to tools and devices for the purpose stated now known to the inventor.

With the above mentioned and other objects in view, the invention consists in the novel and useful provision, formation, construction, association and relative arrangement of parts, members and features, all as shown in a certain embodiment in the accompanying drawings, described generally and more particularly pointed out in the claim.

In the drawing:

FIGURE 3 is a perspective view of a jig used in the practice of the invention;

FIGURE 4 is a plan view of a presser ring used in the practice of the present invention;

FIGURE 5 is a fragmentary, sectional view, on the line 5—5 of FIGURE 5 and showing associated parts used with the presser ring;

FIGURE 6 is the obverse side of the presser ring shown in FIGURE 4;

FIGURE 7 is a sectional view of the presser ring taken on the line 7—7 of FIGURE 6; and, FIGURE 8 is a fragmentary sectional view taken substantially on the line 8—8 of FIGURE 5.

Figure 1:
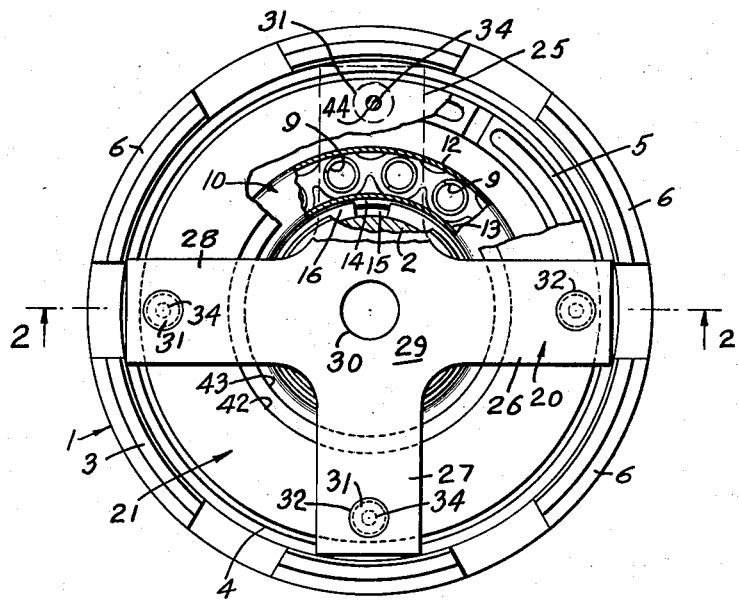
FIGURE 1 is a fragmentary top plan view, partly in section, showing the device of the invention applied to a clutch drum of an automatic transmisison.
Figure 2:
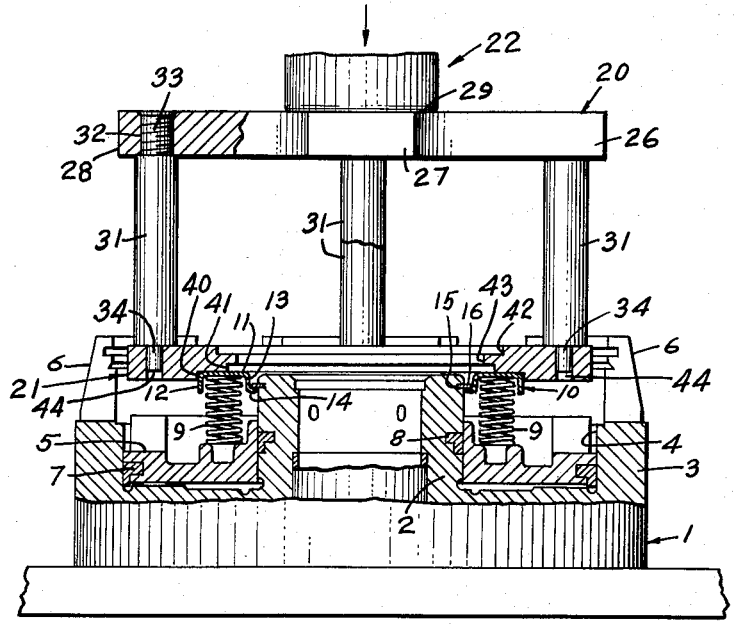
FIGURE 2 is a fragmentary sectional view, taken on the line 2—2 of FIGURE 1.

Referring now to the drawings, and specifically to FIGURES 1 and 2 and for illustrative purposes only, I have shown a clutch drum 1 of standard form such as used on the Corvair automobile, which drum is provided with a central hub 2 and a circular side wall 3 which provides an annular recess 4 between the inner surface of the side wall 3 and the periphery of the hub 2. A piston 5 is received in the recess 4, the recess providing a cylinder. The side wall 3 is formed with an annular series of spaced segmental members 6, the spacing between said segmental members permitting access to the piston 5 and to the annular recess. As a rule, the pistons 5 are provided with an outer seal 7 while the hub is provided with an inner seal 8 for engagement with the piston. Coil springs 9 have one end thereof engaging the piston while a spring retainer ring 10 holds the opposite ends thereof. It will be noted that the axes of the springs 9 are parallel to the axis of the hub and that the spring retainer ring 10 is of channel form having an inverted base 11 with outer and inner circular side walls 12 and 13, the inner circular side wall 13 being provided with an outstanding annular flange 14. The inner edge of the flange 14 has a loose tolerance fit with the periphery of the hub 2. The hub is formed on its periphery with a circular groove 15 adapted to receive a snap ring 16, the snap ring in part extending beyond the periphery of the hub for engagement with the flange 14 of the spring retainer ring. Thus in the showing of FIGURE 2, the annular recess of the clutch drum 1 constitutes a cylinder with a piston therein which is urged to the position shown in FIGURE 2 by the coil springs 9. In some constructions a single large diameter coil spring surrounds the hub and is interposed between a flat spring retainer ring and the piston. When it becomes necessary to disassemble the assembly shown and whether for single spring or multiple spring construction, it is essential that the spring retainer ring 11 be removed so that access may be had to the spring or springs 9 to remove the same and in turn to release the piston from its cylinder. To accomplish this, it has been the practice heretofore to utilize a hydraulic press for the purpose of compressing the spring retainer ring followed by release of the snap ring from the hub, all of which is sometimes difficult to accomplish and is time consuming. It is the purpose of my invention to provide a simple means for assembling or disassembling the piston and the clutch drum.

Other details of clutch drum construction, as well as the piston form as shown in FIGURE 2, are not described as such constructions are standard with different makes of automatic transmissions. I refer, for instance, to the piston and means for holding the base end of the springs thereto, which constitutes a series of pockets.

My invention includes broadly a jig designated generally as 20, a presser ring 21 and means 22 whereby the jig and presser ring may compress the springs 9 for the purpose of disengaging the snap ring 16 from the hub 2, to release the spring retainer ring 10 and allow access to the springs 9, as well as the removal of the piston from the cylinder of the clutch drum. The means 22 may assume several forms and embodiments as hereinafter set forth.

The jig 20 includes a head having four arms 25, 26, 27, and 28, in 90° relationship and of equal lengths and radiating from a central portion 29. All arms lie in the same plane. The central portion 29 is provided with a hole 30. The arms carry depending posts or legs 31, of identical construction, and the axis of each leg is spaced an equal distance from the axis of the hole 30. The legs are held in any convenient manner to the arms such as by providing each arm with a transverse bore 32 for receiving a reduced diameter end 33 for each leg or post and the parts may be joined by screw threads, see FIGURE 2, or by pressure fit, welding, or other convenient means. All of the posts or legs are of the same length and the base ends are provided with a reduced diameter pilot pin 34 lying on the axis of the leg or post.

The presser ring 21 is flat surfaced and provided on each surface with one or more annular ledges or shoulders as shown for one surface in FIGURE 7 at 40 and 41 and for the opposite surface at 42. Each of the ledges or shoulders is co-axial with the central hole 43 of the ring 21. The ring 21 is provided with pilot pin openings 44 in 90° relationship and diametrically spaced apart for receiving the pilot pins 34 of each post or leg 31. The pilot pins 34 have a length substantially equal to the thickness of the ring 21, see FIGURE 5. The annular ledge or shoulder 42 will accommodate therein a spring retainer ring 10 of the type used in Ford, Mercury, and Lincoln automatic transmissions, while the shoulder or ledge 40 on the opposite surface of the ring will accommodate a spring retainer ring of such cars as Corvair, while the ledge or shoulder 41 accommodates a spring retainer ring of a Chrysler automobile known as Powerflite as well as the Chevrolet Turboglide. I have found that four presser rings provided with different diameter ledges or shoulders on both surfaces of the rings will accommodate spring retainer rings for more than fifty different automatic transmissions now being manufactured. The ring 21 shown in the drawings accommodates certain spring retainer rings for certain makes of automobiles. I contemplate in the use of my invention the provision of other rings, in order to complete the set for the transmissions of different makes of automobiles. However, as stated, four rings would be sufficient for the average repair shop.

The means 22 is utilized for the purpose of compressing all of the springs 9 simultaneously. In one embodiment the means 22 may include a rod 50 provided with external screw threads at 51 and 52 which rod terminates at one end with pipe threads 53 for threaded connection with a transverse bar 54 constituting a base member. The threads 52 carry a lock nut for engagement with the bar 54. There is an unthreaded area on the rod 50 between the threaded areas 51 and 52. The threaded area 51 carries a nut 56. In the construction just described, the rod is passed through the hub 2 of the clutch drum 1 with the bar 54 engaging the base of the clutch drum. The nut 56 is removed from the rod so that the rod may be passed through the bore 30 of the jig. The use of the means 22 in connection with the jig and presser ring will be described in the statement of operation. In the form of the means for compressing the springs 9, shown in FIGURE 2, I may place the clutch drum upon the base of a hydraulic or manual arbor press and the arbor, as shown in said figure is brought into engagement with the top surface of the jig. Such shops as may be equipped with hydraulic arbor presses may prefer this method.

The operation, uses and advantages of the invention just described, are as follows.

Assuming that an automatic transmission and particularly the clutch drum and its piston and associated parts is to be disassembled, I utilize either the means 22 shown in FIGURE 3, or the means of FIGURE 2 which includes an arbor and base of an arbor press, and invert the clutch drum so that either it rests on the bar 54 with the rod 50 extending centrally upwardly of the hub 2 of the clutch drum 1, or with the clutch drum resting upon the base of the arbor press, as shown. Assuming use of the arbor press, as shown in FIGURE 2, I select a ring 21 having a shoulder or ledge which will fit or seat the particular make of spring retainer ring, and without play within the annular recess or shoulder portion. This is illustrated in FIGURE 2 wherein it will be noticed that a Corvair type spring retainer ring is accommodated. The presser ring is positioned over the spring retainer ring with the jig secured to the presser ring through medium of the pilot pins 34 entering the pilot pin openings 44 of the presser ring. The arbor is then brought into contact with the top surface of the jig and particularly the surface 29 which is central of the arms 25 to 28 inclusive. The arbor is then moved either manually or hydraulically or by other power which, through the medium of the posts or legs 31, causes the presser ring 21 to move the spring retainer ring downwardly to compress the springs 9. I then utilize an expander tool, the points of which are brought into engagement with the split snap ring 16 to expand the same for release from the groove 15 in the hub 2. This operation is illustrated in FIGURE 8 by both full and dotted lines and wherein the points 60 and 61 of the expander tool engage opposite ends of the snap ring to expand the ring to the position shown in the dotted lines. One of the difficulties usually encountered in removing a snap ring is due to the cramped space usually presented and the difficulty of operating any tool for removing the snap ring. With my invention the posts or legs 31 are widely separated to permit the easy insertion of an expander tool between the posts for engagement with the snap ring. This is illustrated in FIGURES 1 and 2. Thus, when the jig moves downwardly carrying the presser ring, the presser ring likewise moves the spring retainer ring downwardly to compress the springs 9 and fully expose the snap ring 16. The length of the posts or legs 31 is such that there is substantially no interference with the expander tool and its particular function for removing the snap ring. In lieu of using an arbor press, the rod 50 and bar 54 may be utilized, the bar 54 engaging the clutch drum while the nut 56 carried on the screw threads 51 of rod 50 engages the top 29 of the jig. Obviously, turning of the nut 56 moves the jig towards the bar 54 to move the presser ring and the spring retainer ring and compress the springs 9.

After the snap ring is removed, pressure is released from the jig, whereupon the presser ring and jig may be removed, followed by removal of the spring retainer ring 10 for access to the piston, the seals 7 and 8 and the various springs 9 for such repairs as may be necessary, or the correction of any damage to the cylinder or to the piston. Reassembly is the reverse of disassembly. In other words, the piston is placed in the cylinder as shown in FIGURE 2, the springs arranged in proper position relative to the piston and held by the spring retainer ring, followed by the presser ring engaging the spring retainer ring with the jig in place relative to the presser ring whereupon the arbor press of FIGURE 2 or the means of FIGURE 3 is utilized for compressing the springs to reinsert the snap ring in the groove of the hub in such a position that the snap ring is above the flange 14 of the spring retainer ring to limit outward movement of the spring retainer ring.

Certain features of my invention are of importance. It will be noted that the presser ring is formed so as to encircle and hold the spring retainer ring when the presser ring is engaging the same. The jig with its posts or legs is held against slide movement through the use of the pilot pins 34 engaging the pilot pin openings of the presser ring. I am aware that certain mechanics have in the past attempted to compress the springs 9 by applying pressure through some means directly to the spring retainer ring. Unless this pressure is applied to the spring retainer ring in such a manner that it cannot slip sideways relative to the ring, depression of the spring retainer ring is difficult and uncertain. With my invention, the presser ring construction assures that there is no slippage on the spring retainer ring and that all parts used in my invention are held in alignment and in stable position. The arrangement is such that pressure applied to the jig is communicated through the posts or legs evenly to the presser ring. There can be no shifting of the presser ring due to its construction and regardless of the rough handling that tools of this character encounter in repair shops.

I claim:

An automatic transmission tool for compressing springs held by a spring retainer ring, including: a jig having equidistantly spaced apart arms radiating from a center, posts fixedly secured to and depending from each arm of the jig, each post provided with a pilot pin of lesser transverse dimension than that of the post, a presser ring provided with transverse holes for receiving the pilot pins, said presser ring formed with an annular ledge for seating a spring retainer ring of the transmission, the internal diameter of the presser ring being greater than the internal diameter of the spring retainer ring, and compressing means to activate the tool.

References Cited in the file of this patent

UNITED STATES PATENTS

| | | |
|---|---|---|
| 1,826,631 | Payne | Oct. 6, 1931 |
| 2,279,649 | White et al. | Apr. 14, 1942 |
| 2,288,906 | Kaplan | July 7, 1942 |
| 2,377,304 | Appel | June 5, 1945 |
| 2,430,201 | Wyscaver | Nov. 4, 1947 |
| 2,507,003 | Gagne | May 9, 1950 |
| 2,755,540 | Crozier | July 24, 1956 |
| 2,964,841 | Farris | Dec. 20, 1960 |
| 3,078,556 | Carrol | Feb. 26, 1963 |

FOREIGN PATENTS

| | | |
|---|---|---|
| 758,795 | France | Nov. 7, 1933 |